US011963535B2

(12) United States Patent
Caridis et al.

(10) Patent No.: US 11,963,535 B2
(45) Date of Patent: Apr. 23, 2024

(54) TILTED ROLLER SYSTEM FOR LAMINATED PRODUCTS

(71) Applicant: Heat and Control, Inc., Hayward, CA (US)

(72) Inventors: Andrew Anthony Caridis, San Carlos, CA (US); Leopoldo Zarate Andrade, Tlajomulco de Zuñiga (MX); Miguel Angel Gomez Angulo, Zapopan (MX); Sergio Gonzalez Granados, Tlaquepaque (MX); Mario Lorenzana Saucedo, Tlaquepaque (MX)

(73) Assignee: Heat and Control, Inc., Hayward, CA (US)

( * ) Notice: Subject to any disclaimer, the term of this patent is extended or adjusted under 35 U.S.C. 154(b) by 1056 days.

(21) Appl. No.: 16/618,315

(22) PCT Filed: Sep. 25, 2017

(86) PCT No.: PCT/IB2017/055809
§ 371 (c)(1),
(2) Date: Nov. 29, 2019

(87) PCT Pub. No.: WO2018/096411
PCT Pub. Date: May 31, 2018

(65) Prior Publication Data
US 2021/0022349 A1 Jan. 28, 2021

(30) Foreign Application Priority Data
Jun. 5, 2017 (MX) .................... MX/a/2017/007047

(51) Int. Cl.
*A21C 3/02* (2006.01)
*A21C 3/06* (2006.01)
(Continued)

(52) U.S. Cl.
CPC ................ *A21C 3/02* (2013.01); *A23P 20/20* (2016.08); *A21C 3/06* (2013.01); *A21C 9/08* (2013.01)

(58) Field of Classification Search
CPC .... A21C 3/02; A21C 3/06; A21C 9/08; A23P 20/20
See application file for complete search history.

(56) References Cited

U.S. PATENT DOCUMENTS

| 2,631,550 A | 3/1953 | Rhodes |
| 3,704,664 A | 12/1972 | Fisher, Jr. |

(Continued)

FOREIGN PATENT DOCUMENTS

| CN | 86104212 A | 7/1987 |
| CN | 106135330 A | 11/2016 |

(Continued)

OTHER PUBLICATIONS

Response dated Mar. 14, 2022 to Office Action dated Dec. 2, 2021 for Brazilian Patent Application No. 112019017163-0, filed Sep. 25, 2017, pp. 1-32.

(Continued)

*Primary Examiner* — Janie M Loeppke
*Assistant Examiner* — Theodore J Evangelista
(74) *Attorney, Agent, or Firm* — Law Offices of Donald N. MacIntosh

(57) ABSTRACT

A tilted roller system for preparing laminated products having different figures, including three-dimensional rolled figures, wherein said roller system comprises a conveyor band, a start roller band, a roller band and an unloading band.

19 Claims, 7 Drawing Sheets

(51) Int. Cl.
  *A21C 9/08* (2006.01)
  *A23P 20/20* (2016.01)

(56) References Cited

U.S. PATENT DOCUMENTS

| | | | | |
|---|---|---|---|---|
| 3,883,283 | A * | 5/1975 | Herrera | A21C 3/02 |
| | | | | 425/337 |
| 4,741,263 | A | 5/1988 | Ueno et al. | |
| 5,832,813 | A | 11/1998 | Shimazu | |
| 8,808,067 | B2 | 8/2014 | Waldstadt et al. | |
| 2012/0308693 | A1 | 12/2012 | Van Blokland | |
| 2017/0347670 | A1 * | 12/2017 | Caridis | A21C 3/06 |

FOREIGN PATENT DOCUMENTS

| | | |
|---|---|---|
| CN | 205947023 U | 2/2017 |
| EP | 2529629 A1 | 12/2012 |
| EP | 2573011 A1 | 3/2013 |
| ES | 2229904 B1 | 6/2006 |
| JP | 1986-271939 A | 12/1986 |
| WO | 2016/097894 A1 | 6/2016 |

OTHER PUBLICATIONS

Response dated Mar. 23, 2022 to Office Action dated Sep. 23, 2021 for Indian Patent Application No. 201927028804, filed Sep. 25, 2017, pp. 1-44.
Office Action dated Nov. 4, 2020 for Argentinean Patent Application No. P17 01 03240, filed Nov. 22, 2017, pp. 1-5.
Response dated Nov. 27, 2020 to Office Action dated Jul. 16, 2020 for Chinese Patent Application No. 201780089166.7, filed Sep. 25, 2017, pp. 1-9 (with translation).
Translation of response dated Nov. 27, 2020 to Office Action dated Jul. 16, 2020 for Chinese Patent Application No. 201780089166.7, filed Sep. 25, 2017, pp. 1-5.
Decision of Refusal dated Oct. 15, 2020 for Japanese Patent Application No. 2019-546819, filed Sep. 25, 2017, pp. 1-3 (with translation).
Office Action dated Dec. 23, 2020 for Chinese Patent Application No. 201780089166.7, filed Sep. 25, 2017, pp. 1-3 (with translation).
Response dated Feb. 4, 2021 to Office Action dated Nov. 4, 2020 for Argentinean Patent Application No. P17 01 03240, filed Nov. 22, 2017, pp. 1-10.
Response dated Feb. 15, 2021 to Decision of Refusal dated Oct. 15, 2020, for Japanese Patent Application No. 2019-546819, filed Sep. 25, 2017, pp. 1-9.
Response dated Mar. 4, 2021 to Office Action dated Dec. 23, 2020 for Chinese Patent Application No. 201780089166.7, filed Sep. 25, 2017, pp. 1-5 (with translation).
Translation of Decision of Refusal dated Oct. 15, 2020 for Japanese Patent Application No. 2019-546819, filed Sep. 25, 2017, pp. 1-3.
Translation of Office Action dated Dec. 23, 2020 for Chinese Patent Application No. 201780089166.7, filed Sep. 25, 2017, pp. 1-4.
Translation of response dated Mar. 4, 2021 to Office Action dated Dec. 23, 2020 for Chinese Patent Application No. 201780089166.7, filed Sep. 25, 2017, pp. 1-5.
Office Action dated Sep. 23, 2021 for Indian Patent Application No. 201927028804, filed Sep. 25, 2017, pp. 1-6.
EPO Communication dated Sep. 5, 2019 for European Application No. 17873276.4, filed Sep. 25, 2017, requiring a response to the Written Opinion issued for the parent PCT application.
Extended European Search Report dated Aug. 19, 2019 for European Patent Application No. 17873276.4, filed Sep. 25, 2017, pp. 1-9.
International Search Report dated Feb. 9, 2018 for Application No. PCT/US2017/055809, filed Sep. 25, 2017, pp. 1-2.
Office Action dated Feb. 7, 2020 for Chilean Application No. 201902065, filed Sep. 25, 2017, pp. 1-12.
Office Action dated Mar. 9, 2020 for Japanese Patent Application No. 2019-546819, filed Sep. 25, 2017, pp. 1-7 (with translation).
Office Action dated Jul. 16, 2020 for Chinese Patent Application No. 201780089166.7, filed Sep. 25, 2017, pp. 1-7 (with machine translation).
Response dated Dec. 19, 2019 to EPO communication dated Sep. 5, 2019 for European Application No. 17873276.4, filed Sep. 25, 2017, pp. 1-29.
Response dated May 5, 2020 to Office Action dated Feb. 7, 2020 for Chilean Application No. 201902065, filed Sep. 25, 2017, pp. 1-27 (with translation).
Response dated Sep. 9, 2020 to Office Action dated Mar. 9, 2020 for Japanese Patent Application No. 2019-546819, filed Sep. 25, 2017, pp. 1-8 (with Translation).
Translation of Office Action dated Mar. 9, 2020 for Japanese Patent Application No. 2019-546819, filed Sep. 25, 2017, pp. 1-4.
Translation of Office Action dated Jul. 16, 2020 for Chinese Patent Application No. 201780089166.7, filed Sep. 25, 2017, pp. 1-5.
Translation of response dated May 5, 2020 to Office Action dated Feb. 7, 2020 for Chilean Application No. 201902065, pp. 1-5.
Translation of response dated Sep. 9, 2020 to Office Action dated Mar. 9, 2020 for Japanese Patent Application No. 2019-546819, filed Sep. 25, 2017, pp. 1-3.
Written Opinion dated Feb. 9, 2018 for Application No. PCT/US2017/055809, filed Sep. 25, 2017, pp. 1-4.
Office Action dated Dec. 2, 2021 for Brazilian Patent Application No. 112019017163-0, filed Sep. 25, 2017, pp. 1-4 (with machine translation).
Translation of Office Action dated Dec. 2, 2021 for Brazilian Patent Application No. 112019017163-0, filed Sep. 25, 2017, pp. 1-4.

* cited by examiner

TILTED ROLLER SYSTEM FOR LAMINATED PRODUCTS

OBJECT OF THE INVENTION

The present invention refers to a roller system for laminated products which present different figures from at least one type of mass and a combination of them, with the end goal of obtaining different tridimensional rolled figures, for the at least one of their later baking and frying.

BACKGROUND OF THE INVENTION

The rolling methods which exist in the industry only allow for the rolling of the laminated figure, without being able to achieve an open rolling or to control the degree of rolling of the laminated figure, so that the latter is always maintained closed and different figures with the same feeding direction and laminated shapes are not generated. These types of methods are very limited in the laminated shapes that can be developed, given that the rolling carried out by means of band sections placed vertically, and which rest over a horizontal band which is the one which feeds the laminated figures into the oven.

In a similar manner, application MX/a/2014/016071, published as WO 2016/097894, divulges a rolling system for laminated products which comprises a horizontal conveyor band and a band for the start of the rolling, wherein said start rolling band is found in a perpendicular manner to the horizontal conveyor band.

Notwithstanding the rollers which are already known in the state of the art, the need still exists for rolling systems which allow for the carrying out of laminated products in different directions, mainly which will allow the controlling of the opening or closing of the rolling of the laminated product to be fed, as well as freeing the rolling at the desired point to achieve different rolled figures from the same laminated figure.

BRIEF DESCRIPTION OF THE INVENTION

Present invention refers to a rolling system for laminated products which comprises a conveyor hand which is substantially horizontal for receiving and transporting laminated products, a start: rolling band which receives the laminated products from the conveyor band and begins their rolling, the start roller band has an inclination, such that it is not perpendicular to the horizontal conveyor band, a roller band which receives the products which were started to be rolled, rolls them and coveys them, the roller band in an inclined plane which is under the horizontal conveyor band, an unloading band which receives the rolled products and unloads them, said unloading band presents at least four sections with different inclinations, a first section with a substantially horizontal inclination, a second section with an ascending inclination, a third section with a substantially horizontal inclination and a fourth section with a descending inclination.

BRIEF DESCRIPTION OF THE FIGURES

The illustrative embodiment may be described referencing the accompanying figures, which refer to.

DETAILED DESCRIPTION OF THE INVENTION

Figure 1:
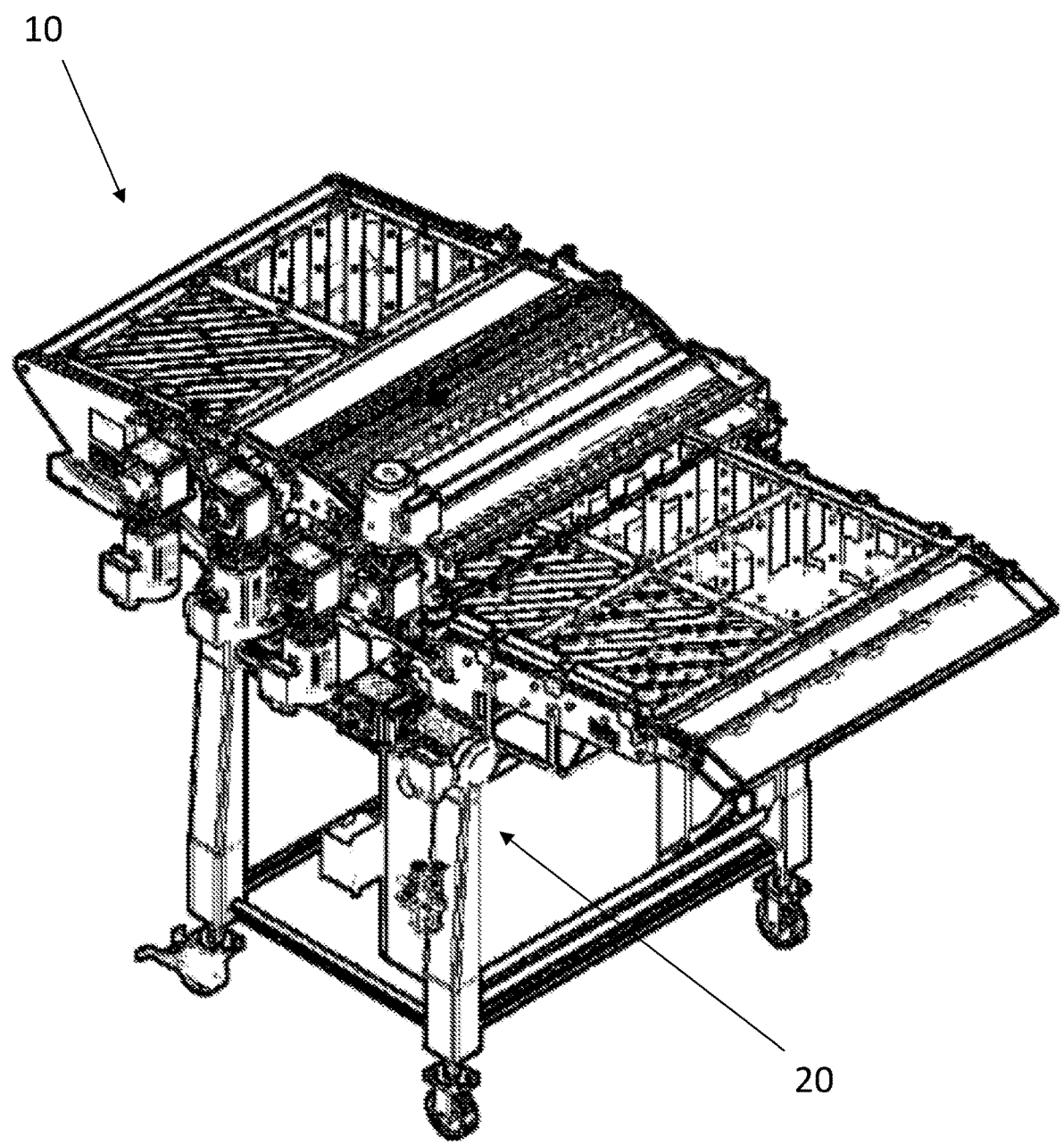
FIG. 1 shows an isometric view of the roller system for laminated products of the present invention.
Figure 2:
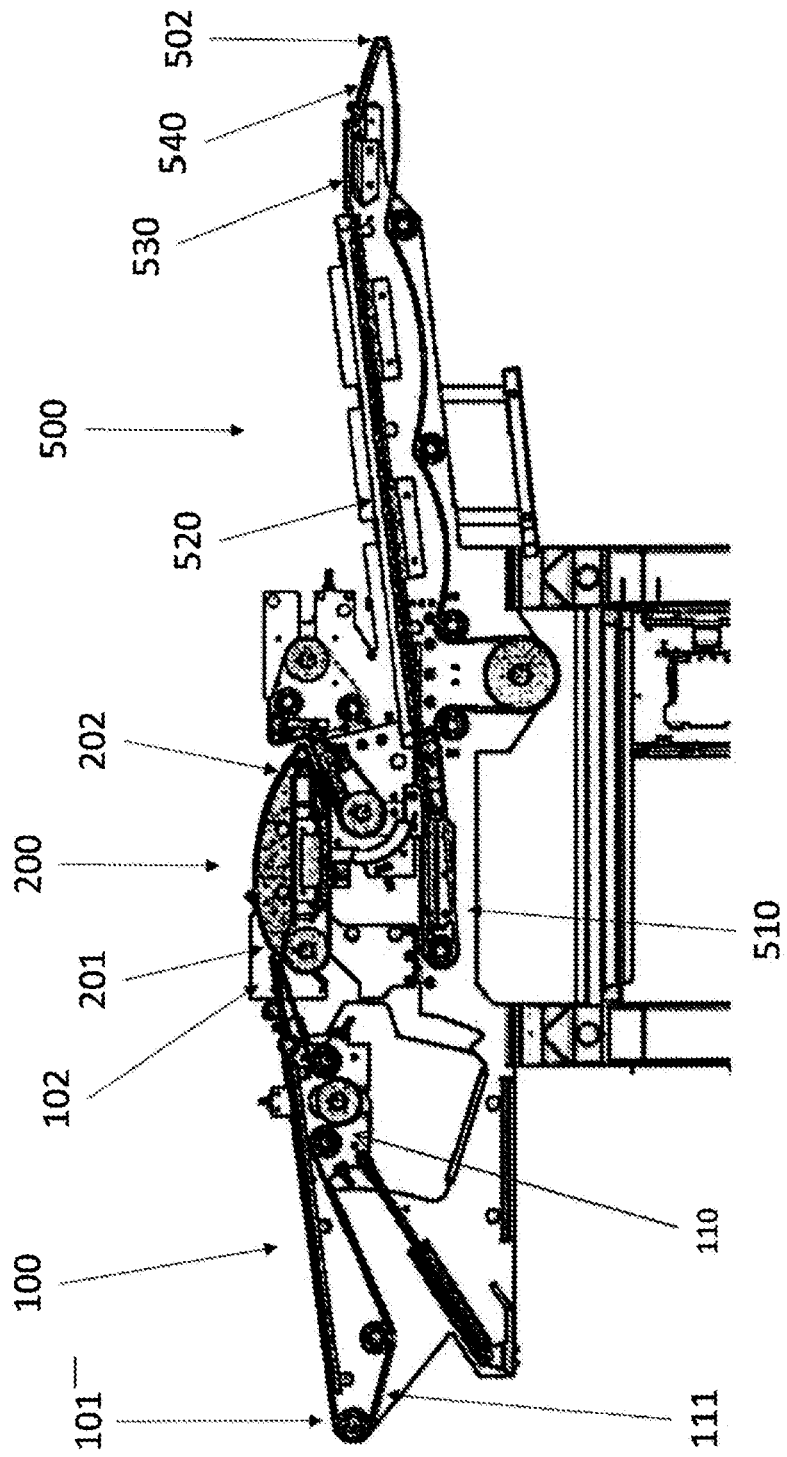
FIG. 2 shows a longitudinal cut of the roller system for laminated products of the present invention.
Figure 3:
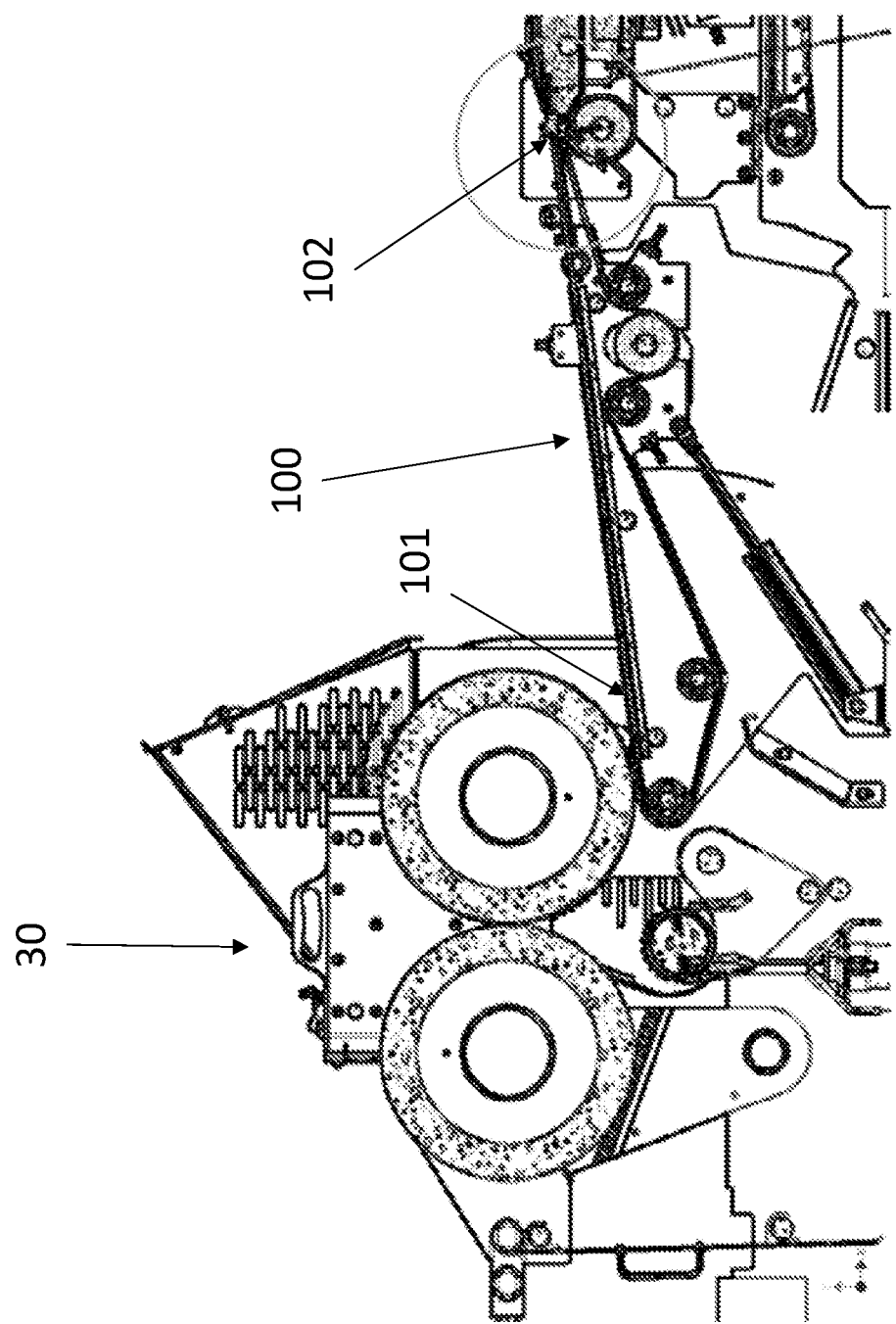
FIG. 3 shows the communication between the exit of the laminated product from the rolling pins to the feeding band in detail.
Figure 4:
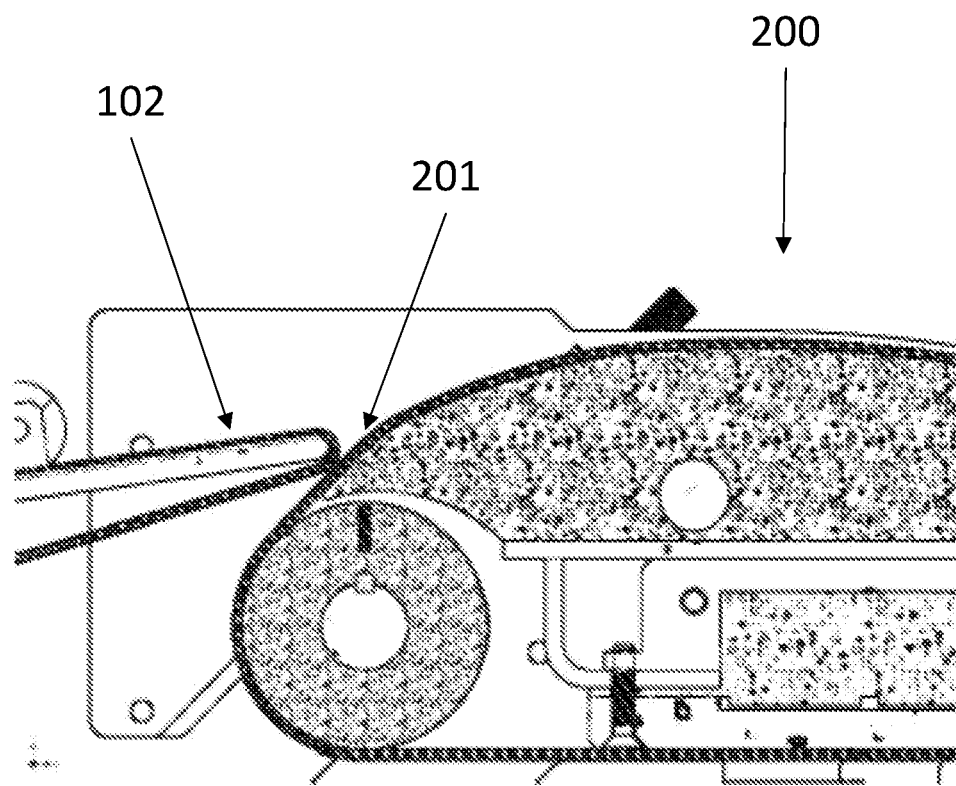
FIG. 4 shows the overlap between the feeding band and the conveyor band in detail.
Figure 5:
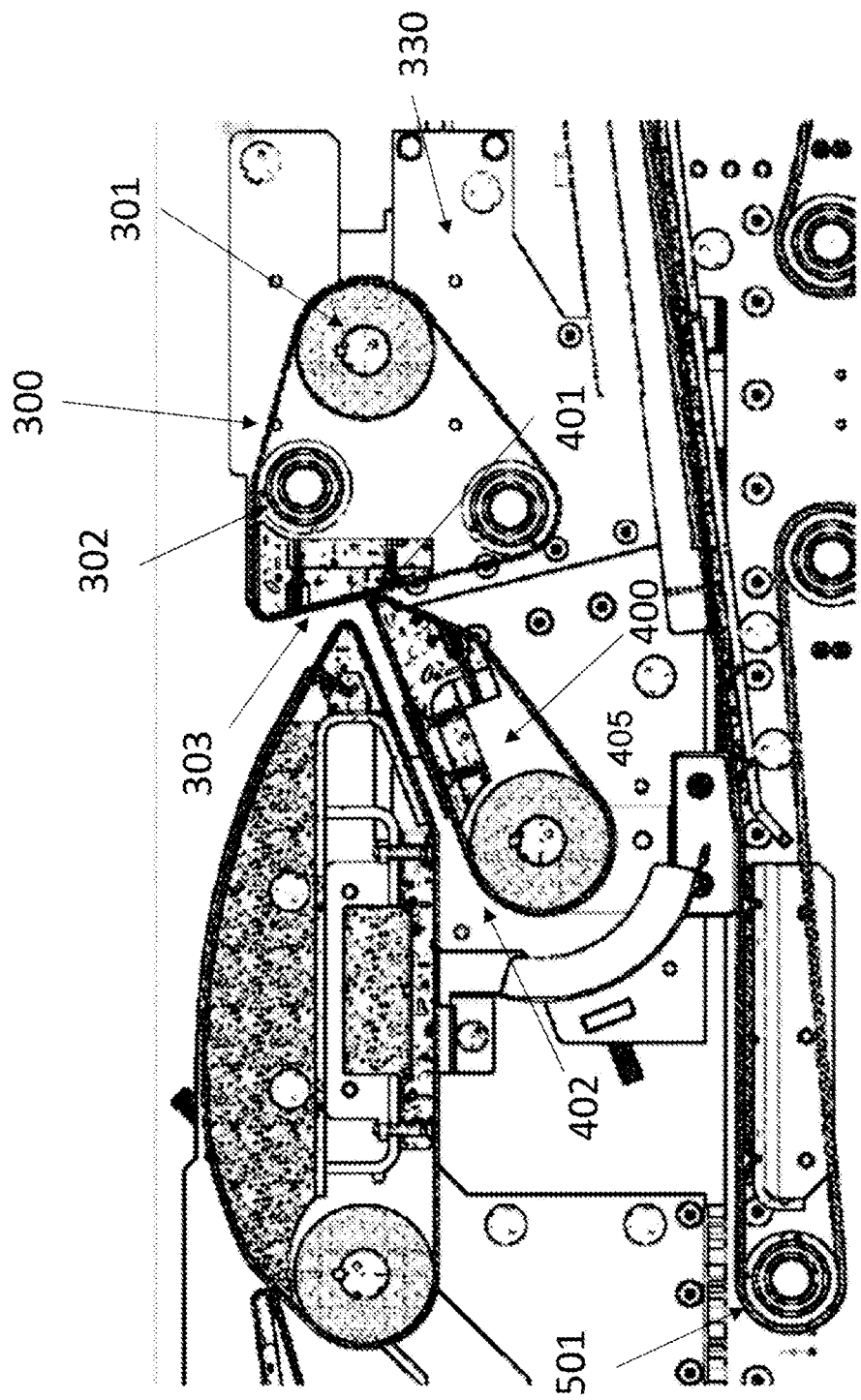
FIG. 5 shows the conveyor band, the start roller band and the rolling band of the roller system for laminated products of the present invention in detail.
Figure 6:
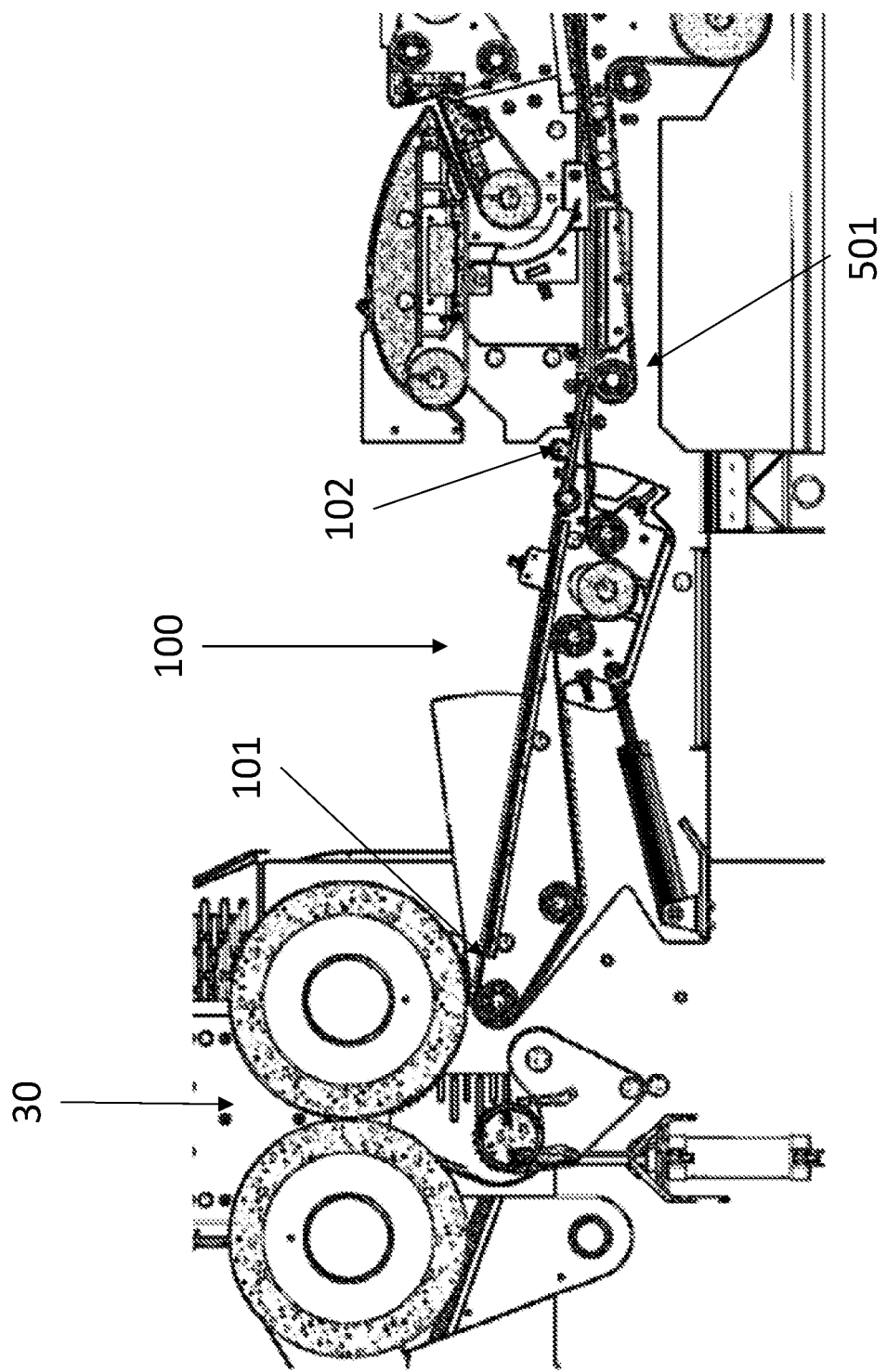
FIG. 6 shows the embodiment where the feeding band is in direct communication with the unloading band.
Figure 7:
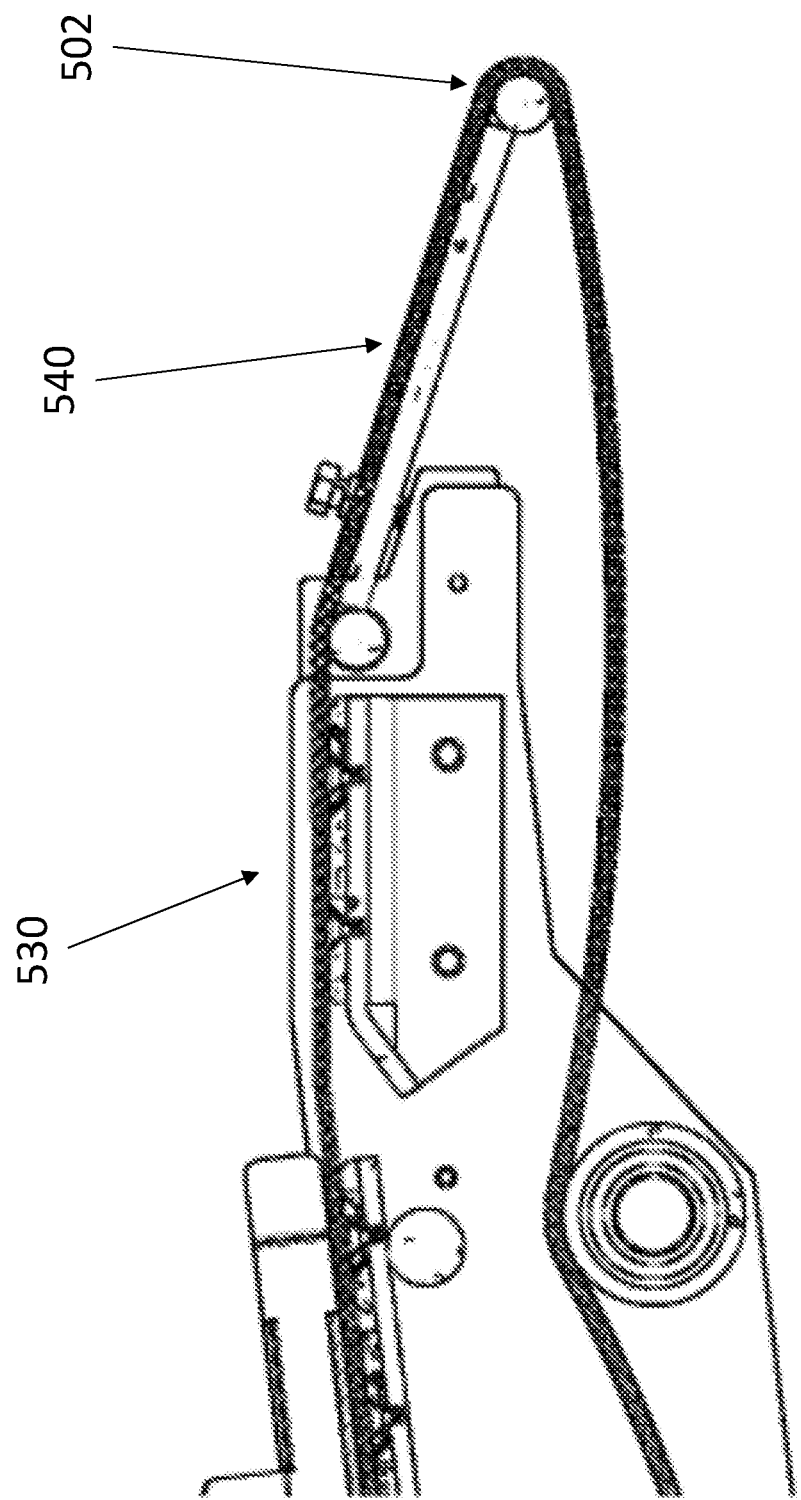
FIG. 7 shows the final end of the unloading band in detail.

The following description makes references to FIGS. 1 through 7 in an indistinctive manner.

The use of the term "approximately" provides a determined additional range. The term is defined in the following manner. The additional range provided by the term is ±10%. By way of example, but not in a limitative manner, if it states "approximately between 25° and 41°", the exact range lies between 22.5° and 45.1°, or yet between 27.5° and 45.1°, or yet between 22.5 and 36.9° or between 27.5° and 36.9°. Any of the possibilities described above are covered through the use of the term "approximately".

The present invention refers to a roller system (10) for laminated products based on any type of mass and/or combination of them. Said rolling system (10) is found set in a main support structure (20).

The roller system (10) presents a feeding band (100), which presents an entrance end (101) as well as an exit end (102), said feeding band (100) is found partially mounted unto a first mobile support structure (110), the feeding band (100) presents a dumping movement at the exit end (102), in such a way that the first mobile support structure (110) presents a pivot (111) near the entrance end (101) of the feeding band (100), in such a way that the first mobile support structure (110) moves with regard to the main support structure (20), said feeding band (100) presents a plurality of tracking rolling pins, a tightening rolling pin and a driving rolling pin, the tightening rolling pin and the driving rolling pin are found set in the first mobile support structure (110), while the tracking rolling pins are distributed between the first mobile support structure (110) and the main support structure (20); said tightening rolling pin is vertically displaced in a groove set on a lateral wall of the first mobile support structure (110).

The exit end (102) of the feeding band (100) is found overlapped with the entrance end (201) of a conveyor band (200); said conveyor band (200) presents a horizontal parabolic shape, preferably convex on the upper part of the main support structure (20), said conveyor band (200) presents an exit end (202) opposite to an entrance end (201), a plurality of tracking rolling pins, a tightening rolling pin and a driving rolling pin, the tightening rolling pin is angularly displaced to tighten the conveyor band and in this way ensure its correct functioning, said displacement is undertaken preferably, by means of a first servo motor.

The exit end (202) of the conveyor band (200) is found in communication with the working surface (303) of a start roller band (300) set on an inclined plane towards the conveyor band (200), in such a way that it presents an inclination from between approximately 95° to approximately 120°, said start roller band (300) comprises a driving roller pin (301) and at least two tracking rolling pins (302); said start roller band (300) has the capability of displacing itself to at least one of a speed and a direction different from those of the conveyor band (200), the above in order to be able to undertake different types of rolling for the laminated products, said start roller band (300) is found mounted unto a second mobile support structure (330), said second mobile support structure (330) is found supported on a longitudinal guiding rail set on the main support structure (20) to longitudinally move the start roller band (300) in regards to the conveyor band (200), in such a way that said start roller band (300) approaches/moves away from the conveyor band (200), this adjustment allows obtaining the desired aperture on the rolled product this adjustment is crucial for achieving the rolling of the product, and is undertaken, preferably by means of a second servo motor.

A roller band (400) set on a descending inclined plane which presents an entrance end (401) and an exit end (402), the roller band (400) comprising a plurality of tracking rolling pins, and a tightening—driving rolling pin; the entry end (401) is found at a point which is higher than the exit end (402), similarly, said entrance end (401) is found under the exit end (102) of the conveyor band (200) and nearby to the work surface (303) of the start roller band (300); said roller band (400) is found mounted unto a third mobile support structure (405) which is found mounted unto a vertical guiding rail, said vertical guiding rail is found mounted unto the second mobile support structure (330), in such a way that said roller band (400) moves vertically in relation to the start roller band (300), this adjustment allows the roller band to approach or move way towards the return of the unloading band (500). This adjustment allows ensuring and maintaining the desired aperture in the rolled product and is undertaken, preferably by means of a third servo motor.

Given that the second mobile support structure (330) and third mobile support structures (405) are found connected, upon the start roller band (300) approaching/moving away from the conveyor band (200), consequently, the roller band (400) also is approaching/moving away from said conveyor band (200), so that said roller band (400) has two movements, one being a vertical movement and the other a longitudinal movement.

An unloading band (500) which receives the laminated product once it is rolled from the roller band (400), in addition to feeding the rolled product to the next step of the process, whether it is baking or frying. Said band comprises an entrance end (501) and an exit end (502), a plurality of tracking rolling pins and one tightening-driving rolling pin, said unloading band (500) is found mounted unto the main support structure (20).

Said unloading band (500) presents at least four sections with different inclinations, a first section (510) with a substantially horizontal inclination, a second section (520) with an ascending inclination, a third section (530) with a substantially horizontal inclination and a fourth section (540) with a descending inclination, set on the lower part of the main support structure, which unrolls the rolled products.

In an additional embodiment, the feeding band (100) presents a length and a capability of being able to pivot, which allows transferring the laminated material without rolling from a laminated system (30) to the next step of the process, in such a way that the laminated material is not rolled.

Said feeding hand (100), when found at its lowest point, allows that: the exit end (102) is found in contact with the entrance end of the unloading band (500), given the pivot (111) which is in close proximity to the entrance end (101) of the feeding band (100) which goes up and down to establish contact with the exit of the laminated system.

Alterations to the structure hereby described for the present invention can be foreseen by those persons skilled in the art. However, it must be understood that present description is related with the preferred embodiments of the invention, which is merely for illustrative purposes and must not be construed as a limitation of present invention. All obvious modifications in the spirit: of the invention, such as changes to the shape, material and sizes of the different elements which make up the invention, must be considered to lie within the scope of the attached claims.

The invention claimed is:

1. A roller band system for laminated products comprising:
    a substantially horizontal conveyor band adapted for receiving and transporting the laminated products,
    a start roller band having a working surface for receiving the laminated products from the conveyor band and beginning rolling of the laminated products to provide partially rolled products, the working surface being inclined from vertical towards the conveyor band for facilitating the beginning of the rolling of the laminated products,
    a roller band for receiving the partially rolled products and rolling them further to provide rolled products, the roller band being under the conveyor band, and
    an unloading band for receiving the rolled products and feeding the rolled products to a next processing step.

2. The system according to claim 1, further comprising:
    a main support structure for carrying the conveyor band,
    a second mobile support structure for moving the start roller band relative to the main support structure,
    a third mobile support structure for moving the roller band relative to the main support structure, and
    the unloading band being carried by a lower part of the main support structure.

3. The system according to claim 2, wherein the second mobile support structure is configured to move the start roller band towards and away from the conveyor band.

4. The system according to claim 2, wherein the third mobile support structure is configured to move the roller band vertically relative to the start roller band.

5. The system according to claim 4, wherein the second mobile support structure is supported on a longitudinal guiding rail mounted on the main support structure to permit the start roller band to move towards and away from the conveyor band.

6. The system according to claim 2, wherein the second mobile support structure includes a vertical guiding rail and the third mobile support structure is mounted for movement on the vertical guiding rail, further comprising a servo motor for moving the roller band relative to the start roller band.

7. The system according to claim 2, wherein the third mobile support structure is coupled to the second support structure to permit vertical movement and longitudinal movement of the roller band.

8. The system according to claim 1, further comprising a feeding band for receiving and feeding the laminated products to the conveyor band.

9. The system according to claim 8, further comprising a first mobile support structure for pivoting the feeding band relative to a main support structure.

10. The system according to claim 9, wherein the first mobile support structure includes a pivot near an entrance end of the feeding band for permitting a dumping movement of the feeding band relative to the main support structure.

11. The system according to claim 1, wherein the conveyor band includes an exit end opposite to an entrance end, a plurality of tracking rolling pins, a tightening rolling pin and a driving rolling pin.

12. The system according to claim 11, wherein the tightening rolling pin is configured to be angularly displaced by means of a servo motor to tighten the conveyor band.

13. The system according to claim 1, wherein the working surface is inclined from vertical from between approximately 95° to approximately 120°.

14. The system according to claim 1, wherein the roller band includes an entrance end, an exit end, a plurality of tracking rolling pins, a tightening rolling pin and a driver rolling pin, wherein the entrance end is higher than the exit end and the entrance end is under an exit end of the conveyor band and near the start roller band.

15. The system according to claim 1, wherein the unloading band includes an entrance end, an exit end, a plurality of tracking rolling pins, a tightening rolling pin and a driver rolling pin.

16. The system according to claim 1, wherein the conveyor band includes a parabolic convex band for facilitating engagement and rolling of the laminated product by the start roller band.

17. The system according to claim 1, wherein the unloading band includes a first section with a substantially horizontal inclination, a second section with an ascending inclination, a third section with a substantially horizontal inclination and a fourth section with a descending inclination.

18. A roller band system for laminated products comprising:

a main support structure, a convex conveyor band adapted for receiving and transporting the laminated products carried by the main support structure, a start roller band having a working surface for receiving the laminated products from the convex conveyor band and beginning rolling of the laminated products to provide partially rolled products, the working surface being inclined from vertical towards the conveyor band for facilitating the beginning of the rolling of the laminated products, a second mobile support structure carried by the main support structure for moving the start roller band towards and away from the convex conveyor band, a roller band for receiving the partially rolled products and rolling them further to provide rolled products, the roller band being under the conveyor band, a third mobile support structure carried by the main support structure for moving the roller band vertically relative to the start roller band, and an unloading band carried by the main support structure for receiving the rolled products from the roller band and feeding the rolled products to a next processing step.

19. The system according to claim 18, wherein the unloading band includes a first section with a substantially horizontal inclination, a second section with an ascending inclination, a third section with a substantially horizontal inclination and a fourth section with a descending inclination.

* * * * *